US012754778B2

(12) United States Patent
Srivastava et al.

(10) Patent No.: US 12,754,778 B2
(45) Date of Patent: Oct. 6, 2026

(54) SYSTEMS AND METHODS FOR ORCHESTRATING JOBS

(71) Applicant: Capital One Services, LLC, McLean, VA (US)

(72) Inventors: Manish Srivastava, Glen Allen, VA (US); Deepak Kumar Soni, Chantilly, VA (US); Amit Pathak, Bear, DE (US)

(73) Assignee: Capital One Services, LLC, McLean, VA (US)

( * ) Notice: Subject to any disclaimer, the term of this patent is extended or adjusted under 35 U.S.C. 154(b) by 300 days.

(21) Appl. No.: 18/636,585

(22) Filed: Apr. 16, 2024

(65) Prior Publication Data

US 2025/0156243 A1 May 15, 2025

Related U.S. Application Data

(60) Provisional application No. 63/598,840, filed on Nov. 14, 2023.

(51) Int. Cl.
*G06F 9/50* (2006.01)
*G06F 9/48* (2006.01)

(52) U.S. Cl.
CPC .......... *G06F 9/5083* (2013.01); *G06F 9/4881* (2013.01); *G06F 2209/503* (2013.01)

(58) Field of Classification Search
CPC ................. G06F 9/5083; G06F 9/4881; G06F 2209/503; G06F 2209/548; G06F 9/5011; G06F 9/5022; G06F 9/5027; G06F 9/5044; G06F 9/505; G06F 9/5077;
(Continued)

(56) References Cited

U.S. PATENT DOCUMENTS

| | | | |
|---|---|---|---|
| 8,484,353 | B1 | 7/2013 | Johnson et al. |
| 9,996,380 | B2 | 6/2018 | Singh et al. |
| 10,719,369 | B1 | 7/2020 | Aithal et al. |

(Continued)

OTHER PUBLICATIONS

"Error: Failover behavior between VPCs in AWS Glue", Troubleshooting errors in AWS Glue for Spark, AWS Glue User Guide, Amazon Web Services, https://docs.aws.amazon.com/glue/latest/dg/glue-troubleshooting-errors.html#vpc-failover-behavior-error-10, Retrieved Mar. 21, 2024.

(Continued)

*Primary Examiner* — Sisley N Kim
(74) *Attorney, Agent, or Firm* — Bookoff McAndrews, PLLC

(57) ABSTRACT

For each job of a plurality of jobs, a plurality of instances of the job may be generated that are associated with a plurality of subnets of a plurality of regions of an account. Job allocation requests received at a queue may be sequentially processed to determine a respective subnet of a respective region to allocate each job to. The determination may be
(Continued)

200 based on a number of data processing units currently available to the account and one or more subnet conditions of the subnets. Each job may be allocated accordingly to cause an execution of an instance of each job associated with the respective subnet of the respective region. As each job is allocated, a resource status table for the account may be maintained. The table may be updated based on a deallocation request received at the queue subsequent to a completion of each job.

20 Claims, 5 Drawing Sheets

(58) Field of Classification Search
CPC ........... H04L 61/5007; H04L 2101/668; H04L 67/1029; H04L 67/1008
See application file for complete search history.

(56) References Cited

U.S. PATENT DOCUMENTS

| | | | | |
|---|---|---|---|---|
| 11,373,231 | B2 * | 6/2022 | Soohoo | G06V 10/84 |
| 11,671,486 | B1 * | 6/2023 | McCullagh | H04L 67/1034<br>709/226 |
| 11,853,807 | B1 * | 12/2023 | Coult | G06F 9/5077 |
| 2020/0293216 | A1 * | 9/2020 | Su | G06F 3/0604 |
| 2023/0396511 | A1 * | 12/2023 | Zhou | G06F 11/0709 |
| 2024/0414121 | A1 * | 12/2024 | Parikh | H04L 61/4511 |
| 2025/0103392 | A1 * | 3/2025 | Haridas | G06F 9/4856 |

OTHER PUBLICATIONS

Luc van Donkersgoed, "Implement the Priority Queue Pattern with SQS and Lambda", Luc van Donkersgoed's Notes, Posted Apr. 25, 2022, https://lucvandonkersgoed.com/2022/04/25/implement-the-priority-queue-pattern-with-sqs-and-lambda/, Retrieved Mar. 21, 2024.
"What is Amazon Simple Queue Service?", AWS Simple Queue Service Developer Guide, Amazon Web Services, https://docs.aws.amazon.com/AWSSimpleQueueService/latest/SQSDeveloperGuide/welcome.html, Retrieved Mar. 21, 2024.
"Set Concurrency Limits on Individual AWS Lambda Functions", Amazon Web Services, Posted Nov. 30, 2017, https://aws.amazon.com/about-aws/whats-new/2017/11/set-concurrency-limits-on-individual-aws-lambda-functions/, Retrieved Mar. 21, 2024.
"Describe-subnets", AWS CLI Command Reference, Amazon Web Services, https://docs.aws.amazon.com/cli/latest/reference/ec2/describe-subnets.html, Retrieved Mar. 21, 2024.
"Task Timer (Lambda, Amazon SNS)", AWS Step Functions Developer Guide, Amazon Web Services, https://docs.aws.amazon.com/step-functions/latest/dg/task-timer-sample.html, Retrieved Mar. 21, 2024.

* cited by examiner

SYSTEMS AND METHODS FOR ORCHESTRATING JOBS

CROSS-REFERENCE TO RELATED APPLICATION(S)

This application claims the benefit of priority to U.S. Provisional Application No. 63/598,840, filed Nov. 14, 2023, which is incorporated herein by reference in its entirety.

TECHNICAL FIELD

Various embodiments of this disclosure relate generally to techniques for orchestrating jobs, and, more particularly, to systems and methods for queuing and allocating jobs.

BACKGROUND

Entities implementing virtual networks are increasingly shifting to serverless computing platforms for managing and/or orchestrating data processing jobs, particularly when the volume and/or complexity of the data processing jobs is high. An example virtual network may include one or more virtual private clouds (VPCs). Each VPC may be associated with or specific to a region. Each VPC may include one or more availability zones, and each availability zone may include one or more subnets with a specific number of Internet Protocol (IP) addresses assigned or allocated to each subnet. The IP addresses may correspond to servers configured for executing operations and/or tasks associated with data processing jobs. An example serverless computing platform may be configured to allocate a job to a subnet of the virtual network or otherwise fail the job. However, conventional allocation logic implemented by serverless computing platforms results in inefficiencies across the virtual network, particularly when a high volume of jobs and/or jobs with high workloads are to be processed.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for job orchestration. The methods and systems may include queuing and allocating jobs.

In some aspects, the techniques described herein relate to a method for orchestrating jobs, the method including: receiving, from a queue, a first allocation request for a first job of a plurality of jobs, wherein a plurality of instances of the first job have been generated and associated with a plurality of subnets of a plurality of regions of an account; determining a number of data processing units currently available to the account meets or exceeds a number of data processing units for performing the first job; determining at least a first subnet of a first region and a second subnet of the first region, of the plurality of subnets of the plurality of regions, meet one or more subnet conditions to perform the first job; based on one or more load balancing rules, determining to allocate the first job to one of the first subnet or the second subnet to cause execution of an instance of the first job, from the plurality of instances of the first job, associated with the one of the first subnet or the second subnet; notating the allocating of the first job to the one of the first subnet or the second subnet in a resource status table for the account; subsequent to a completion of the first job, receiving, from the queue, a first deallocation request for the first job; and updating the resource status table based on the first deallocation request.

In some aspects, the techniques described herein relate to a method for orchestrating jobs, the method including: receiving, at a queue, a plurality of allocation requests for a plurality of jobs, wherein a plurality of instances of each job of the plurality of jobs have been generated and associated with a plurality of subnets of a plurality of regions of an account; sequentially processing the plurality of allocation requests from the queue to determine a respective subnet of a respective region, of the plurality of subnets of the plurality of regions, to allocate each job of at least a subset of the plurality of jobs to, wherein the determination is based on a number of data processing units currently available to the account and one or more subnet conditions of the plurality of subnets; maintaining a resource status table for the account based on the determined allocations; allocating each job of at least the subset of the plurality of jobs to the respective subnet of the respective region determined based on the processing to cause an execution of an instance of each job associated with the respective subnet of the respective region; subsequent to a completion of each job of at least the subset of the plurality of jobs, receiving, at the queue, a deallocation request for each job; and updating the resource status table based on the deallocation request.

In some aspects, the techniques described herein relate to a method for orchestrating jobs, the method including: receiving an allocation request for a job; selecting a subnet of a region, of a plurality of subnets of a plurality of regions of an account, to perform the job based on a determination that (i) a number of data processing units currently available to the account meets or exceeds a number of data processing units for performing the job derived from the allocation request, and (ii) the subnet meets one or more subnet conditions for performing the job, the one or more subnet conditions including a number of currently available Internet Protocol (IP) addresses of the subnet that meets or exceeds a number of IP addresses for performing the job derived from the allocation request; tracking resources to be allocated to the selected subnet of the region for performing the job within a resource status table for the account, the resources including the number of data processing units of the account and the number of IP addresses of the subnet of the region allocated for performing the job; allocating the job to the selected subnet of the region to be performed; subsequent to a completion of the job, receiving a deallocation request for the job; and updating the resource status table based on the deallocation request to indicate the resources allocated for performing the job as available resources for a subsequent allocation.

BRIEF DESCRIPTION OF THE DRAWINGS

The accompanying drawings, which are incorporated in and constitute a part of this specification, illustrate various exemplary aspects and together with the description, serve to explain the principles of the disclosed aspects.

DETAILED DESCRIPTION

Figure 1:
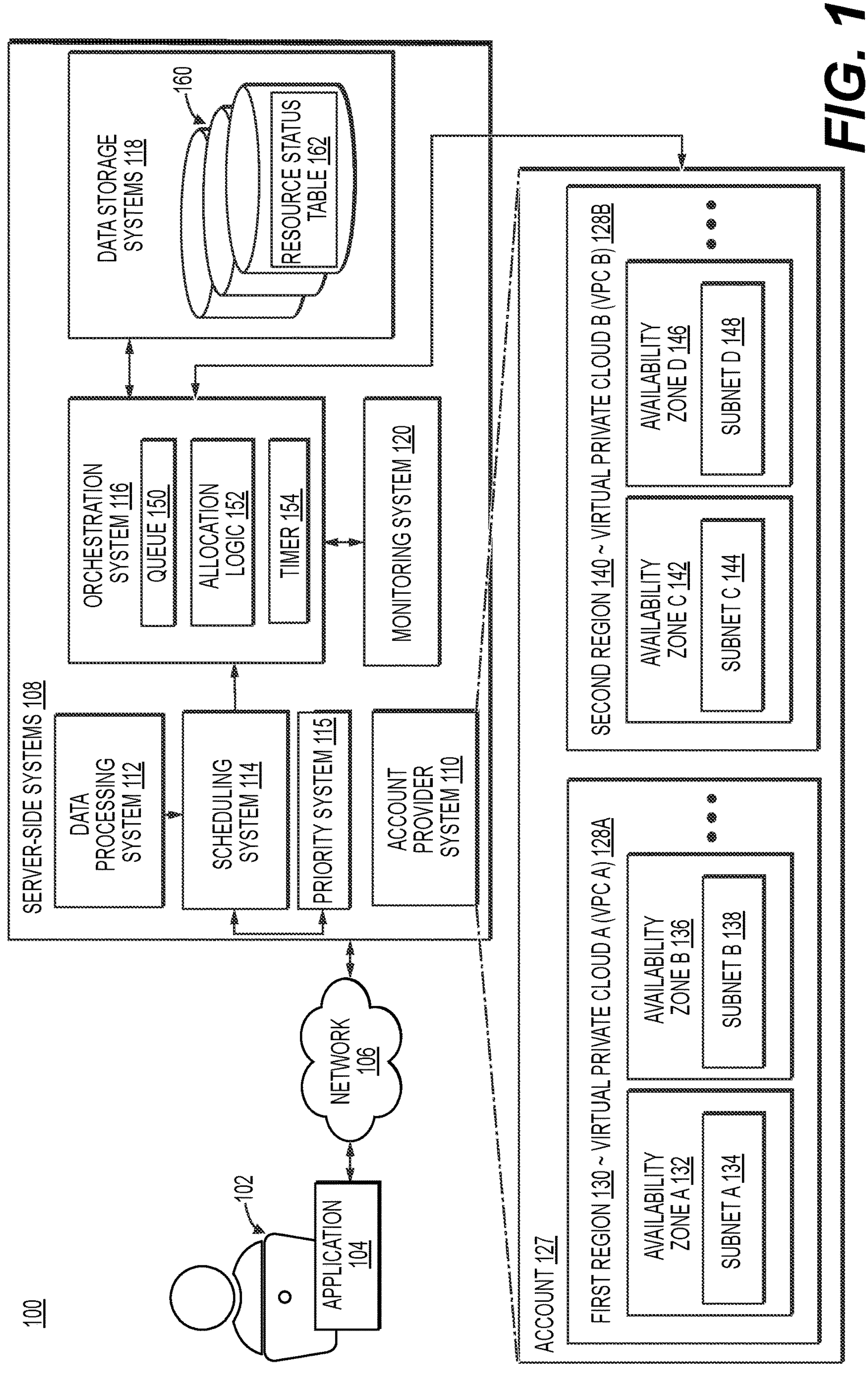
FIG. 1 depicts an exemplary environment for job orchestration, according to certain aspects.

According to certain aspects of the disclosure, methods and systems are disclosed for job orchestration. As briefly discussed above, an example virtual network may include one or more virtual private clouds (VPCs) associated with an account provisioned by an account provider. Each VPC may be associated with or specific to a region. Each VPC may include one or more availability zones, and each availability zone may include one or more subnets with a specific number of Internet Protocol (IP) addresses assigned or allocated to each subnet. The IP addresses may correspond to servers configured for executing operations and/or tasks associated with data processing jobs. A serverless computing platform for managing and/or orchestrating data processing jobs may be configured to allocate a job to a subnet of the virtual network to enable execution of the tasks or operations thereof or may otherwise fail the job. However, conventional allocation logic used by serverless computing platforms to determine how to allocate or otherwise fail the job, in view of constraints and limitations of the provisioned account, results in inefficiencies across the virtual network, particularly when a high volume of jobs and/or jobs with high workloads are to be processed.

For example, in order to be able to execute a job, a sufficient number of data processing units (DPUs) need to be available to allocate to the job. However, only a limited number of DPUs may be provisioned by the account provider to the account for concurrent use. The limit may be adjusted by submitting a request to the account provider. However, the request may take several hours or even days for the account services provider to process and perform the adjustment, and proof or evidence of the need for the adjustment may be required as part of the request. Therefore, using conventional allocation logic, if there are insufficient DPUs available to perform a job, the job may fail. Failure of the job may require manual intervention to retry the job.

Similarly, subnets of the account include a limited number of IP addresses that are allocated or assigned to the subnets. For example, a first subnet may have 20 IP addresses assigned to the first subnet, and a second subnet may have 10 IP addresses assigned to the second subnet. Therefore, once all IP addresses of a subnet have been allocated to jobs and are thus unavailable, no further jobs can be allocated to that subnet until one or more of those IP addresses are deallocated and become available again. If no IP addresses are available in any of the subnets of a given region or VPC, the job may fail. Additionally, the job may only be capable of being run in one particular region or VPC. Therefore, if all the subnets of that particular region are unhealthy and/or have no IP addresses available, the job cannot be failed over to another region or VPC that may have subnets available.

Conventional allocation logic also results in an imbalance and underutilization of subnets of the account. Jobs may be configured to run in more than one subnet based on connections (e.g., based on connection parameters or properties included in the jobs that associate the jobs with the subnets). However, the connections with each subnet may be ordered (e.g., a first connection with a first subnet, a second connection with a second subnet, and so on), and the conventional allocation logic may only allocate the job to a next connection's subnet if the previous connection's subnet is unhealthy or has no IP addresses left. For example, if a region or VPC includes a first healthy subnet that only has 1 currently available IP address to be allocated and a second healthy subnet that has 10 currently available IP addresses to be allocated, and a job to be allocated requires 5 workers (e.g., 5 servers and thus 5 IP addresses), conventional allocation logic will allocate the job to the first subnet because at least 1 IP address is currently available. Resultantly, secondary connections may be underutilized and jobs may execute more slowly. Continuing with the above example, even though the job requires 5 IP addresses, the job will start to execute on the first subnet because the 1 IP address is free. However, the job may then have to be paused until additional IP addresses become available on the first subnet.

Further to the inefficiencies above, often times there may be multiple different job types associated with different applications or use cases to be executed in parallel. Some of these applications or use cases may be of higher priority than others. However, conventional serverless computing platforms fail to provide a queuing mechanism for prioritizing the allocation and execution of higher priority jobs.

To address these challenges, systems and methods for job orchestration are described herein to promote utilization of subnets within and across regions of the account, provide job queuing as opposed to job failures, and provide priority scheduling in order to provide increased scalability, availability, and resiliency. In an exemplary use case, a plurality of instances of a job to be performed may be generated and associated with a plurality of subnets of a plurality of regions of an account. An allocation request for the job may be received at a queue of an orchestration system. The allocation request may include the job name, a number of workers to perform the job, and a worker type of the workers. Additionally, the allocation request may include a priority associated with the job.

In some examples, the queue may include multiple queues corresponding to different levels of priority such that, if the job is of a higher priority (e.g., as indicated by the allocation request), the allocation request may be placed in the corresponding queue. Each of the queues may be first in first out (FIFO) queues such that requests are placed, and subsequently sent to allocation logic for processing, in the order in which they are received at the respective queue. Requests placed in higher priority queues may be sent to the allocation logic for processing ahead of requests in lower priority queues.

The allocation request may be processed to determine a respective subnet of a respective region of the account to allocate each job to. The determination may be based on a number of DPUs currently available to the account and one or more subnet conditions of subnets of a first region (e.g., first VPC) of the account. For example, if the number of DPUs currently available to the account does not meet or exceed a number of DPUs for performing the job, which may be derived from the allocation request, the job may be queued instead of failed. Such queuing may increase uptime or availability. For example, a message including the allocation request may be generated and transmitted to the queue. The message may be associated with a visibility timeout, and only upon expiration of a time period associated with the visibility timeout, is the queue able to read the message and resend the allocation request to the allocation logic for re-processing (e.g., under the assumption that after this passage of time sufficient DPUs may now be available to allocate to the job).

Alternatively, if the number of DPUs currently available to the account meets or exceeds a number of DPUs for performing the job, a determination is made as to whether any subnets of the first region meet the subnet conditions. The subnet conditions may include the subnet having a positive health status and/or a number of currently available IP addresses that meet or exceed a number of IP addresses for performing the job (e.g., identified from the allocation request). If two or more subnets of the first region of the VPC are determined to meet the subnet conditions, the job may be allocated to one of the two or more subnets based on one or more load balancing rules to promote utilization of subnets within the first region. If only one of the subnets of the first region is determined to meet the subnet conditions, the job may be allocated to the one subnet.

If no subnets of the first region are determined to meet each of the subnet conditions, the job may be treated differently based on which of the subnet conditions the subnets fail to meet. For example, if at least one of the subnets of the first region is healthy (e.g., has a positive health status) but fails to meet the subnet conditions because the number of currently available IP addresses of the at least one subnet is less than the number of IP addresses for performing the job, the job may be queued. For example, a message including the allocation request for the job and associated with a visibility timeout may be generated and transmitted to the queue. Upon expiration of a time period associated with the visibility timeout, the queue is able to read the message and resend the allocation request to the allocation logic for re-processing (e.g., under the assumption that after this passage of time sufficient IP addresses of the healthy subnet may now be available to allocate to the job). However, if no subnets of the first region are determined to meet the subnet conditions because each of the subnets is unhealthy (e.g., has a negative health status), the job may be failed over to a second region (e.g., a second VPC) of the account, and allocated to one of the subnets within the second region. This above-described allocation determination scheme may increase resiliency and enable withstanding of both subnet and region failures.

Upon allocation of the job to the respective subnet of the respective region, the instance of the job associated with the respective subnet may be executed by the respective subnet. Additionally, resources of the account allocated for performing the job, such as the number DPUs and the number of IP addresses of the respective subnet allocated to the job, may be tracked using a resource status table for the account. The resource status table may be later updated based on a deallocation request for the job received at the queue subsequent to a completion of the job. That is, the resource status table may be a continuously updated data source for tracking resources within the account as they are allocated to jobs (become unavailable) and then deallocated from jobs (become available again) for use by the allocation logic when making the above-described allocation determinations.

While specific examples included throughout the present disclosure involve orchestrating data processing jobs within one or more VPCs or regions, it should be understood that techniques according to this disclosure may be adapted to any job type in other similar virtual networks. It should also be understood that the examples above are illustrative only. The techniques and technologies of this disclosure may be adapted to any suitable activity.

Accordingly, reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" may convey "based at least in part on." The singular forms "a," "an," and "the" may include plural referents unless the context dictates otherwise. The term "exemplary" may be used in the sense of "example" rather than "ideal." The terms "comprises," "comprising," "includes," "including," or other variations thereof, may convey a non-exclusive inclusion such that a process, method, or product that comprises a list of elements does not necessarily include only those elements, but may include other elements not expressly listed or inherent to such a process, method, article, or apparatus. The term "or" may be interpreted disjunctively, such that "at least one of A or B" includes, (A), (B), (A and A), (A and B), etc. Similarly, the term "or" is intended to mean "and/or," unless explicitly stated otherwise. "And/or" may convey all permutations, combinations, subcombinations, and individual instances of items or terms included within a list of the items or terms.

Terms like "provider," "service provider," or the like may generally encompass an entity or person involved in providing, selling, and/or renting items to persons, as well as an agent or intermediary of such an entity or person. An "item" may generally encompass a good, service, or the like having ownership or other rights that may be transferred, such as cloud provisioning services, data processing services, scheduling services, orchestration services, data storage services, and/or monitoring services. As used herein, terms like "user" generally encompass any person or entity that may interact as a data manager, for example, with an application associated with a data processing system to facilitate generation and/or scheduling of jobs, for example. The term "application" may be used interchangeably with other terms like "program," "dashboard," or the like, and generally encompasses software that is configured to interact with, modify, override, supplement, or operate in conjunction with other software. The term "job" may generally encompass a data processing job associated with an application or use case that includes one or more tasks or operations to be executed.

FIG. 1 depicts an exemplary environment 100 for job orchestration, according to certain aspects, and which may be used with the techniques presented herein. A computing device 102 of a user may communicate with one or more of the other components of the environment 100 across electronic network 106, including one or more server-side systems 108, discussed below, to initiate and/or otherwise facilitate job orchestration. The user may be associated with (e.g., the user may be a data manager of a system associated with) an entity. The user, among other roles, may be responsible for managing the generation, scheduling, and/or execution of jobs for various applications or use cases. As one non-limiting example, an application may include pre-screening services, and example jobs may include processing of pre-screen requests received. The environment 100 of FIG. 1 shows one computing device 102. However, in other examples, there may be a plurality of computing devices 102 that are each communicating with one or more server-side systems 108 to initiate and/or otherwise facilitate job orchestration for different applications and/or use cases, for example.

The server-side systems 108 may include an account provider system 110, a data processing system 112, a scheduling system 114, a priority system 115, an orchestration system 116, one or more data storage systems 118, and/or a monitoring system 120, among other systems. In some examples, two or more systems of the server-side systems 108 may be associated with a common provider. In such examples, the two or more systems may be part of a cloud service computer system (e.g., in a data center). In other examples, two or more systems of the server-side systems 108 may be associated with a different provider, and each of the different providers may interact with one another to provide respective services.

The above-provided examples are exemplary and non-limiting. The systems and devices of the environment 100 may communicate in any arrangement. As will be discussed herein, systems and/or devices of the environment 100 may communicate in order to perform job orchestration processes, among other activities.

The computing device 102 may be configured to enable the user to access and/or interact with other systems in the environment 100. For example, the computing device 102 may be a computer system such as, for example, a desktop computer, a laptop computer, a tablet, a smart cellular phone, a smart watch or other electronic wearable, etc. In some embodiments, the computing device 102 may include one or more electronic applications, e.g., a program, plugin, browser extension, etc., installed on a memory of the computing device 102. In some embodiments, the electronic applications may be associated with one or more of the other components in the environment 100. For example, an application 104 associated with the data processing system 112 and/or the scheduling system 114 may be executed on the computing device 102 to enable the user to manage job generation and/or scheduling for an application or use case. In some examples, the applications, including the application 104, may be thick client applications installed locally on the computing device 102 and/or thin client applications (e.g., web applications) that are rendered via the web browser launched on the computing device 102.

Additionally, one or more components of the computing device 102 may generate, or may cause to be generated, one or more graphic user interfaces (GUIs) based on instructions/information stored in the memory of the computing device 102, instructions/information received from the other systems in the environment 100, and/or the like and may cause the GUIs to be displayed via a display of the computing device 102 (e.g., as separate notifications or as part of the application 104). The GUIs may be, e.g., application interfaces or browser user interfaces and may include text, input text boxes, selection controls, and/or the like. The display may include a touch screen or a display with other input systems (e.g., a mouse, keyboard, etc.) for the user to control the functions of computing device 102.

The account provider system 110 may include one or more server devices (or other similar computing devices) for executing account services for an account 127 associated with the entity, including cloud provisioning services for the account 127. Example cloud provisioning services may broadly include tasks associated with provisioning a virtual network, including one or more VPCs such as a VPC A 128A and VPC B 128B, that are dedicated to the account 127. In some examples, and as shown in FIG. 1, the account 127 may include a plurality of regions, including at least a first region 130 and a second region 140, and each of the VPCs may be associated with or specific to the one of the regions. For example, VPC A 128A may be associated with or specific to the first region 130, and VPC B 128B may be associated with or specific to the second region 140. In some examples, the regions may correspond to geographical regions of service. For example, the first region 130 may be associated with an eastern region of the United States of America, whereas the second region may be associated with a western region of the United States of America. Each VPC may include a plurality of availability zones. For example, the VPC A 128A may include an availability zone A 132 and an availability zone B 136. The VPC B 128B may include an availability zone C 142 and an availability zone D 146. Each of the availability zones may include at least one subnet. For example, the availability zone A 132 may include a subnet A 134, the availability zone B 136 may include a subnet B 138, the availability zone C 142 may include a subnet C 144, and the availability zone D 146 may include a subnet D 148.

Each subnet may be a range (e.g., a subset) of IP addresses available in the account 127. Each IP address may correspond to a server device hosted by the account service provider that is configured to perform or execute one or more tasks or operations of a job (e.g., a job generated by the data processing system 112). For example, a given job may require 10 IP addresses, and thus 10 server devices to perform the various tasks or operations of the job to complete the job. The range of IP addresses for the subnets of the account 127 may be configurable. For example, the subnet A 134 may include 20 IP addresses, whereas the subnet B 138 may include 10 IP addresses.

The account services provider may also provision a predefined number of data processing units (DPUs) to the account 127. The predefined number of DPUs may be based on service quota limits for the account 127. The predefined number of DPUs may represent a maximum number of DPUs that may be allocated for performing jobs at any one time in the account 127. A number of DPUs needed to perform (and thus allocated to) a job may be based on a number of workers (e.g., a number of IP addresses corresponding to servers) and a worker type of the workers needed to perform the job. The different worker types may have different memory, compute, and/or storage capacities. The predefined number of DPUs initially agreed upon and provisioned to the account of the entity may be modified by the account services provider in response to an adjustment request from the entity. However, the request may take several hours or even days for the account services provider to process and proof or evidence of the needed for the adjustment may be required as part of the request.

The data processing system 112 may include one or more server devices (or other similar computing devices) for executing data processing associated with an application or a use case for the entity. Example data processing may broadly include tasks associated with generating jobs for execution. The jobs may be data processing jobs. Each job may include one or more tasks or operations to be performed to complete the job. The jobs may include scheduled jobs (e.g., anticipated or known jobs to be performed at predefined intervals at predefined times) or ad hoc jobs. As one, non-limiting example, the data processing system 112 may be a pre-screening system configured to, among other things, process or fulfill pre-screen requests, where a job request may be generated for each pre-screen request to be processed. The environment 100 of FIG. 1 shows one data processing system 112. However, in other examples, there may be a plurality of data processing systems 112, where each of the data processing systems 112 may be associated with a different application or use case of the entity, and generate different job types associated with the respective application or use case.

The scheduling system 114 may include one or more server devices (or other similar computing devices) for executing job scheduling services for the entity. Example job scheduling services may broadly include tasks associated with generating and/or forwarding job allocation requests for a plurality of jobs to the orchestration system 116 to initiate the job orchestration processes. For example, allocation requests may be generated for jobs received from the data processing system 112, and the allocation requests may be provided to the orchestration system 116. In some examples, the scheduling system 114 may also generate and send a priority request, including job attributes of the job obtained from the data processing system 112, to the priority system 115. A priority received in response from the priority system 115 may then be included in the allocation request or otherwise provided to the orchestration system 116 to enable appropriate queue placement. Alternatively, the allocation request may be generated by and received from the data processing system 112, and forwarded to the orchestration system 116. In some examples, the scheduling system 114 may be a subsystem of a larger system dedicated to the application or use case for which the jobs are being generated, such as the data processing system 112.

The priority system 115 may include one or more server devices (or other similar computing devices) for executing job prioritization services for the entity. An example job prioritization service may broadly include receiving a priority request for a job from the scheduling system 114, analyzing one or more attributes of the job provided as part of the priority request to determine an associated priority of the job, and providing the priority of the job to the scheduling system 114 as a response to the priority request. In some examples, and as described in more detail below, the analysis of the job attributes may be based on a plurality of rules. The priority of the job may affect a queue placement and thus a timing associated with the processing of the job allocation request for the job by the orchestration system 116.

The orchestration system 116 may include one or more server devices (or other similar computing devices) for executing orchestration services for the entity, including job orchestration. Example orchestration services may broadly include tasks associated with queuing and processing job allocation and deallocation requests, as well as maintaining a resource status table 162 for the account 127 to notate allocations and deallocations determined from the processing of the requests. The orchestration system 116 may include a plurality of operational components to facilitate these tasks, including at least a queue 150, allocation logic 152, and a timer 154.

For example, the queue 150 may be configured to receive an allocation request and/or a deallocation request for a job and maintain a position or order of the request, among other requests received by the queue 150, for processing by the allocation logic 152. For example, the queue 150 may be a first in first out (FIFO) queue such that the requests within the queue 150 are sent to the allocation logic 152 for processing in an order in which the requests are received at the queue 150. However, in some examples, the deallocation requests may be prioritized over the allocation requests within the queue. Additionally, in further examples, the queue 150 may include more than one FIFO queue to facilitate priority queuing. For example, a high priority of a job (e.g., determined by the priority system 115) may be reflected in an allocation request for the job or otherwise provided to the orchestration system 116, and the high priority may cause the job to be assigned to a corresponding high priority queue. Allocation requests within the high priority queue may be sent to the allocation logic 152 for processing ahead of any allocations requests within lower priority queue(s).

The allocation logic 152 may be implemented as one or more serverless compute functions configured to process the allocation and the deallocation requests, and maintain the resource status table 162 for the account 127 accordingly. In instances when the allocation logic 152, as part of processing an allocation request for a job, determines insufficient resources are available to allocate the job, the timer 154 may be configured to help re-queue the job in the queue 150, as opposed to failing the job. For example, and as described in more detail below, the timer 154 may be configured to place a visibility timeout on a message including the allocation request that is sent by the allocation logic 152 to the queue 150. Upon expiration of the visibility timeout, the queue 150 may be able to read the message and send the allocation request to the allocation logic 152 for re-processing.

The data storage systems 118 may include a server system or computer-readable memory such as a hard drive, flash drive, disk, etc. In some examples, the data storage systems 118 may include and/or interact with an application programming interface for exchanging data to other systems, e.g., one or more of the other components of the environment 100, such as the orchestration system 116. In other examples, one or more of the data storage systems 118 may be a sub-system or component of the orchestration system 116.

The data storage systems 118 may include and/or act as a repository or source for various types of data for the orchestration system 116. For example, the data storage systems 118 may include a plurality of data stores 160, and at least one of the data stores 160 may store the resource status table 162 for the account 127 that is maintained by the orchestration system 116. The resource status table 162 may be a ledger, for example, that tracks resources of the account 127 as they are allocated to and subsequently deallocated from jobs. Example resources that are tracked may include DPUs of the account 127 and IP addresses of subnets that are allocated to performing jobs (and thus are currently unavailable), in addition to DPUs of the account 127 and IP addresses of subnets that are deallocated upon completion of jobs (and thus are now available again for subsequent allocation). The resource status table 162 may be referenced by the allocation logic 152 when processing allocation requests.

The monitoring system 120 may include one or more server devices (or other similar computing devices) for executing monitoring services for the entity related to job orchestration processes performed by the orchestration system 116. Example monitoring services may broadly include tasks associated with generating and transmitting alerts when certain types of available resources of the account 127 have reached a predefined threshold (e.g., when a predetermined percentage of available DPUs or IP addresses have been utilized). Other tasks may include generating and transmitting alerts when one or more processes of the orchestration system 116 fail or downtime associated with one or more components of the environment 100, such as the orchestration system 116 and/or the data storage systems 118, is detected.

The network 106 over which the one or more components of the environment 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some aspects, the network 106 may be an internal and/or private network. In some examples, the network 106 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The computing device 102 and one or more of the server-side systems 108 may be connected via the network 106, using one or more standard communication protocols. The computing device 102 and one or more of the server-side systems 108 may transmit and receive communications from each other across the network 106, as discussed in more detail below.

Although depicted as separate components in FIG. 1, it should be understood that a component or portion of a component in the system of exemplary environment 100 may, in some embodiments, be integrated with or incorporated into one or more other components. For example, the scheduling system 114 may be integrated with the data processing system 112, one or more of the data storage systems 118 or the monitoring system 120 may be integrated with the orchestration system 116, or the like. In some embodiments, operations or aspects of one or more of the components discussed above may be distributed amongst one or more other components. Any suitable arrangement and/or integration of the various systems and devices of the exemplary environment 100 may be used.

In the following disclosure, various acts may be described as performed or executed by a component from FIG. 1, such as the computing device 102 or one or more of the server-side systems 108, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
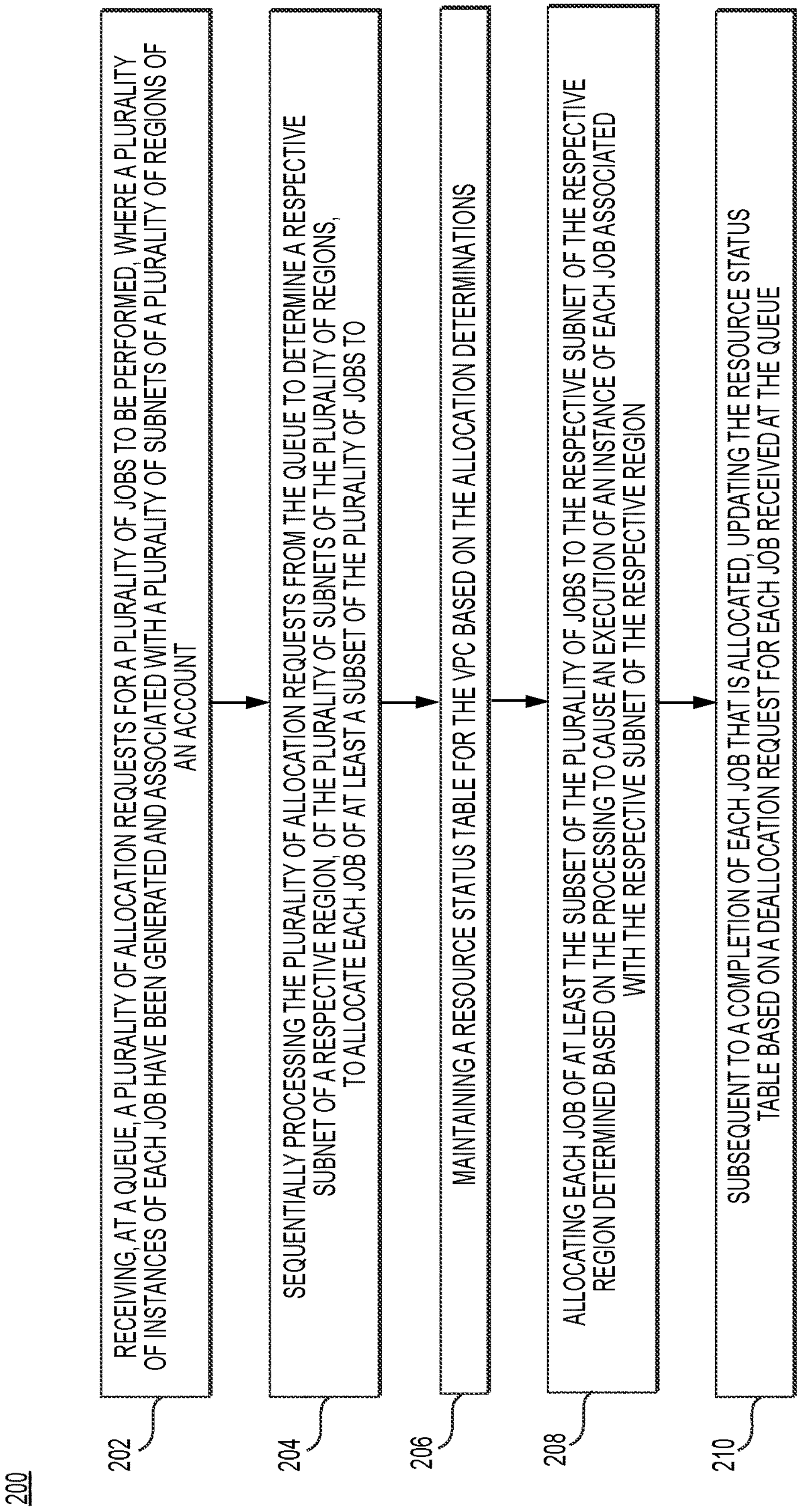
FIG. 2 depicts a flowchart of an example method for orchestrating jobs, according to certain aspects.
Figure 3:
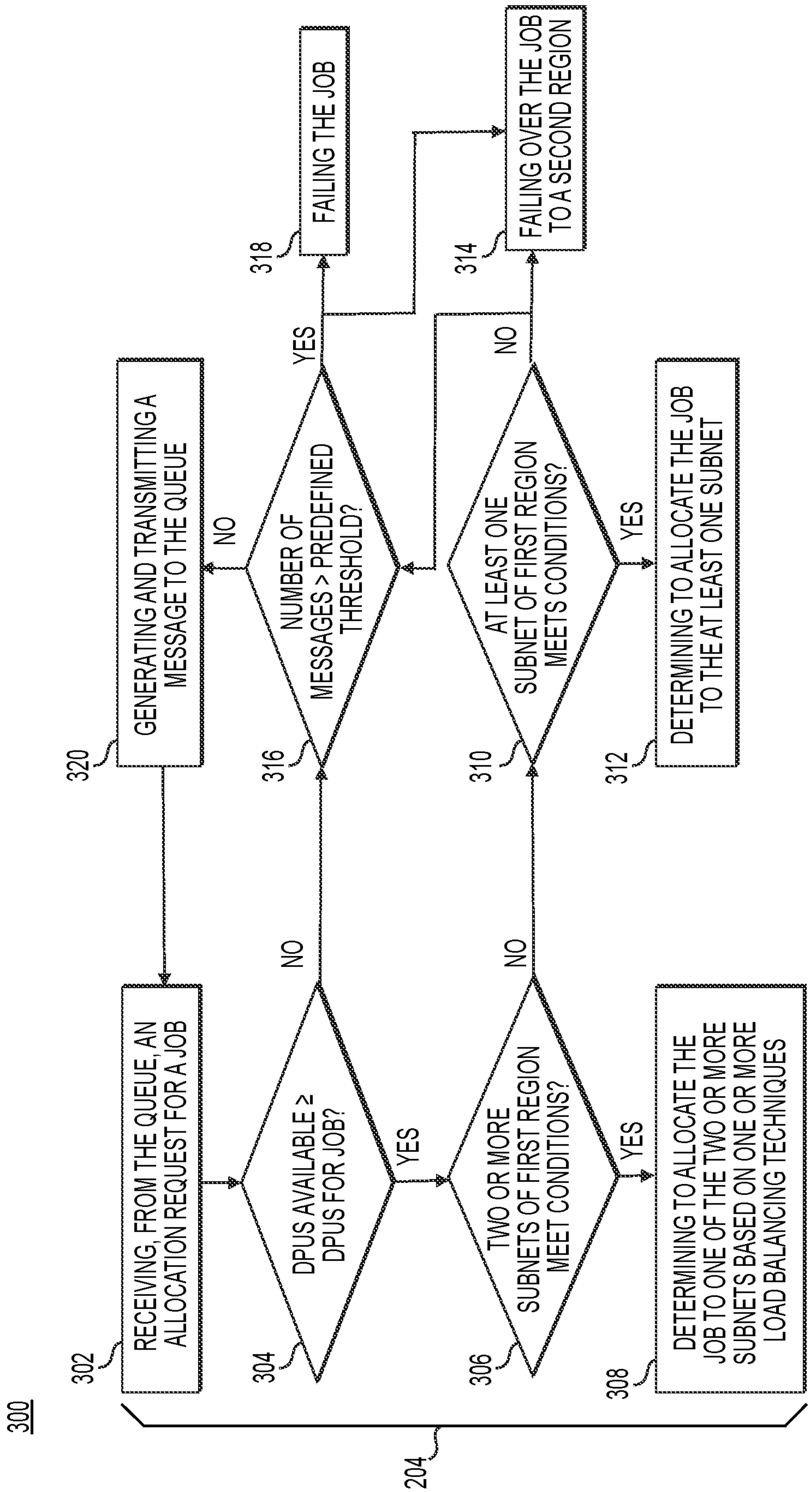
FIG. 3 depicts a flowchart of an example method for processing an allocation request, according to certain aspects.

FIG. 2 depicts a flowchart of an example process 200 for orchestrating a plurality of jobs in the environment 100 of FIG. 1. FIG. 3 depicts a flowchart of an example process 300 for processing an allocation request for a job as part of the process 200. Various steps of the process 200 and the process 300 may be performed by one or more components of the environment of FIG. 1, including at least the orchestration system 116.

Referring to FIG. 2, at step 202, the process 200 may include, receiving, at the queue 150, a plurality of allocation requests for a plurality of jobs to be performed. The queue 150 may be a FIFO queue, and thus the queue 150 may place or order the allocation requests among one another based on a receiving order of the allocation requests to the queue 150. Each allocation request may include information associated with the job, such as a name of the job, a number of workers for the job, and a worker type of the workers. The number of workers for the job may refer to a number servers, and thus a number of IP addresses corresponding to the number of servers, needed to execute the tasks or operations of the job. The worker type may indicate memory, compute, and/or storage capacity requirements for the workers that are to be executing the tasks or operations of the job. The worker type may impact a number of DPUs of the account 127 to be allocated to the job, as described in detail below.

For each job for which an allocation request is received, a plurality of instances of the job may have been generated and associated with a plurality of subnets of a plurality of regions of the account 127. The instances may be identical to one another. A number of instances generated may correspond to a number of the subnets across the plurality of regions of the account 127, such that one instance may be generated and associated with each one of subnets. The instances may be associated with the subnets based on connection parameters or properties configured for the instances of the jobs. By generating and associating one instance of the job with each of the subnets of the account 127, the job is able to be invoked or executed by any one of the subnets of the account 127.

In some examples, the instances of the jobs may be generated by the data processing system 112, and indications of the jobs to be performed may be sent from the data processing system 112 to the scheduling system 114. The scheduling system 114 may then generate and send the allocation requests for the jobs to the orchestration system 116 for placement in the queue 150. In other examples, the data processing system 112 may generate the allocation requests, and the scheduling system 114 may simply intercept and pass through the allocation requests to the orchestration system 116 at an appropriate timing.

Figure 4:
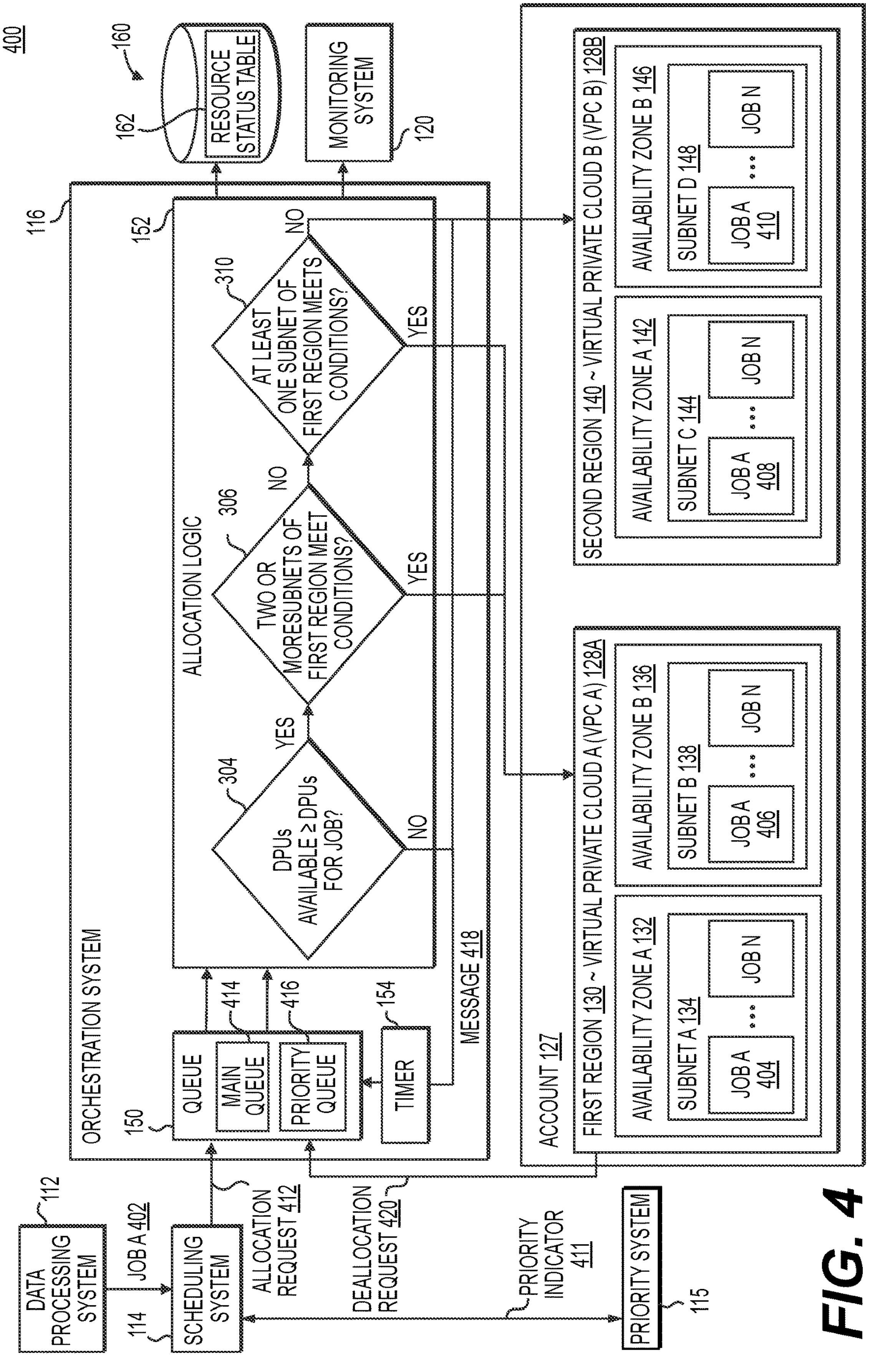
FIG. 4 depicts a system flow diagram of an example job orchestration process, according to certain aspects.

In some aspects, and as shown and described in FIG. 4, the queue 150 may include a plurality of queues corresponding to a plurality of priority levels. In some examples, the allocation requests may include an indication of priority associated with the job (e.g., a priority indicator). In other examples, the priority indicator may be provided to the orchestration system 116 independently from the allocation requests, but in association with the corresponding jobs. For example, for a job, scheduling system 114 may generate and send a priority request, including job attributes of the job, to the priority system 115. The priority system 115 may apply one or more of a plurality of rules to the job attributes to determine the priority for the job. The priority system 115 may then provide the priority indicator to the scheduling system 114 as a response to the priority request for inclusion within the allocation request for the job or independent forwarding to the orchestration system 116. Priority decisioning may be based on service level agreements (SLA), business value or impact to the entity, or other similar factors. Therefore, example job attributes for analysis may include a time sensitivity of the job, a nature or intent of the job, a business unit associated with the job, etc. One example rule applied may be that jobs associated with (e.g., generated by) the data processing system 112 are high priority jobs. The priority indicator may be in a categorical format (e.g., high, standard), a numerical format (e.g., 0 or 1 to designate high priority or not), or any other format that can be utilized to connote differing levels of priority. Based on the priority indicators for the jobs, the allocation requests for the jobs may be placed in a corresponding queue. Each of the queues may be FIFO queues, however, higher priority queues may be prioritized. Resultantly, any allocation requests placed in a higher priority queue may be sent to the allocation logic 152 for processing prior to the any allocation requests placed in lower priority queues, even if a request in a lower priority queue was received prior to the request in the higher priority queue.

At step 204, the process 200 may include sequentially processing the plurality of allocation requests from the queue 150 to determine a respective subnet of a respective region, of the plurality of subnets of the plurality of regions, to allocate each job of at least a subset of the plurality of jobs to. As previously mentioned, the queue 150 may send the allocation requests to the allocation logic 152 based on an order in which the allocation requests were received at the queue 150 (e.g., a first allocation request in is the first allocation request out). Only one allocation request may be sent from the queue 150 to the allocation logic 152 at a time such that the allocation logic 152 processes the allocation requests sequentially.

Referring now to FIG. 3, one or more steps or decisions of the process 300 may be used to perform at least part of step 204 of the process 200 described with reference to FIG. 2. The process 300 may be performed by the allocation logic 152. At step 302, the process 300 may include receiving, from the queue 150, an allocation request for a job (e.g., one of the allocations requests received at step 202 to be processed at step 204). Upon receiving the allocation request, the allocation logic 152 may perform a series of decisions.

At decision 304, a determination of whether a number of DPUs currently available to the account 127 meets or exceeds a number of DPUs for performing the job may be made. The resource status table 162 may be queried or otherwise utilized to determine the number of DPUs currently available to the account 127 (e.g., the number of DPUs that are not already allocated to other jobs). In other examples, an API call may be utilized to determine the number of DPUs currently available to the account 127. The number of DPUs for performing the job may be determined based on a number of workers to perform the job and a worker type of the workers identified from the allocation request. For example, values for the number of workers and the worker type may be multiplied to determine the number of DPUs for performing the job. The number of DPUs currently available to the account 127 may then be compared to number of DPUs for performing the job.

If at decision 304, the number of DPUs currently available to the account 127 is determined to meet or exceed the number of DPUs for performing the job (yes), the process 300 may proceed to decision 306. At decision 306, a determination of whether two or more subnets of the first region 130 meet one or more subnet conditions to perform the job may be made.

One of the subnet conditions may include a positive health status of the subnet. The health status may be determined by transmitting an API call to the subnet. An indication of the health status of the subnet (e.g., positive health status, negative health status, etc.) may then be received in a response to the API call.

Another one of the subnet conditions may include that a number of currently available IP addresses of the subnet meets or exceeds a number of IP addresses for performing the job. In some examples, the response to the API call transmitted to obtain the health status of the subnet may also include the number of currently available IP addresses of the subnet. Additionally or alternatively, the resource status table 162 may be queried or otherwise utilized to determine the number of currently available IP addresses of the subnet. The number of IP addresses for performing the job may be determined based on the number of workers included in the allocation request. For example, the number of workers refers to a number of servers needed, and thus a corresponding number of IP addresses needed. The number of currently available IP addresses of the subnet may then be compared to the number of IP addresses for performing the job.

If each of the one or more subnet conditions are determined to be met for two or more of the subnets of the first region 130 at decision 306 (yes), the process 300 may proceed to step 308. At step 308, the process 300 may include determining to allocate the job to one of the two or more subnets based on one or more load balancing techniques (e.g., one or more load balancing rules). One example may include a round robin load balancing technique. To provide an illustrative example, if both of the subnet A 134 and the subnet B 138 of the first region 130 are determined to meet the subnet conditions to perform the job, and an immediately preceding job was allocated to the subnet A 134, the job may be allocated to the subnet B 138. Application of the load balancing techniques may help to equalize utilization across the healthy subnets of the first region 130, which may improve a throughput of the VPC A 128A and/or the account 127 and increase a speed at which jobs may be executed without comprising resiliency.

However, if at decision 306, there is a failure to identify at least two subnets of the first region 130 that meet each of the subnet conditions (no), the process 300 may proceed to decision 310. At decision 310, a determination of whether at least one subnet of the first region 130 meets the subnet conditions to perform the job may be made. If at decision 310, at least one subnet of the first region 130 is determined to meet the subnet conditions to perform the job (yes), the process 300 may proceed to step 312. At step 312, the process 300 may include determining to allocate the job to the at least one subnet determined to meet the subnet conditions. For example, if the subnet A 134 is the only subnet of the first region 130 that meets the subnet conditions to perform the job, the job may be allocated to the subnet A 134.

Alternatively, if at decision 310, no subnet of the first region 130 is determined to meet the subnet conditions to perform the job (no), the process 300 may proceed to either step 314 or decision 316 depending on which of the subnet conditions that the subnets of the first region 130 fail to meet. For example, if at least one of the subnets of the first region 130 is healthy (e.g., has a positive health status) but fails to meet the subnet conditions because the number of currently available IP addresses of the at least one subnet is less than the number of IP addresses for performing the job, the job may be processed for queuing, and the process 300 may proceed to decision 316, as described in detail below. Otherwise, if none of the subnets of the first region 130 are healthy, then the process may proceed to step 314.

At step 314, the process 300 may include failing over the job to the second region 140 (or other region of the account 127 different from the first region 130). Failing over the job may include allocating the job to be performed by one of the subnets of the second region 140, such as the subnet C 144 or the subnet D 148. To enable such failing over, dependencies, such as accessibility to data files needed to execute the tasks or operation of the job, may be available in the second region 140 (or other region of the account 127 different from the first region 130).

Returning to decision 304, if at decision 304, the number of DPUs currently available to the account 127 is determined not to meet or exceed the number of DPUs for performing the job (no), the process 300 may instead proceed to decision 316. At decision 316, a determination of whether a number of messages generated in association with the allocation request exceeds a predefined threshold may be made.

A message may be generated in association with the allocation request when, as part of the processing of the allocation request, it is determined that a sufficient number of DPUs are unavailable in the account 127 to perform the job (e.g., at decision 304) or a sufficient number of IP addresses of subnets in the first region 130 are unavailable to perform the job (e.g., at decision 310). As described in more detail with reference to step 320 below, the message may be generated in order to place the allocation request back in the queue 150 to enable re-processing at a subsequent time (e.g., under the assumption that DPUs will become available as other jobs are completed), as opposed to failing the job. Failing the job would require manual intervention of the user to, for example, manage re-generation and/or scheduling of the job via the data processing system 112.

However, if a sufficient number of DPUs to perform the job continues to be unavailable in the account 127 after re-processing the allocation request a predefined number of times, the job may have to be failed. The predefined number of times the allocation request can be re-processed before job failure may correspond to the predefined threshold for the number of messages. Therefore, at decision 316, if the number of messages generated in association with the allocation request based on DPU deficiency is determined to exceed the predefined threshold (yes), the process 300 may proceed to step 318. The number of messages exceeding the predefined threshold may indicate that the allocation request has been re-processed the predefined number of times. Therefore, at step 318, the process 300 may include failing the job. Alternatively, at decision 316, if the number of messages generated in association with the allocation request based on IP address unavailability is determined to exceed the predefined threshold (yes), the process 300 may proceed to step 314, where the job may be failed over to the second region 140, as described in detail above.

Otherwise, if at decision 316, the number of messages generated in association with the allocation request based on DPU insufficiency and/or IP address unavailability is determined not to exceed the predefined threshold (no), the process 300 may proceed to step 320. At step 320, the process 300 may include, generating and transmitting a message to the queue 150. As briefly described above, the message may be generated in order to place the allocation request back in the queue 150 to enable re-processing at a subsequent time. For example, the message may include the allocation request and be associated with a predefined visibility timeout period. For example, the timer 154 may be configured to place a visibility timeout on the message that corresponds to the predefined visibility timeout period. The placement of the visibility timeout on the message may cause the message, and thus the allocation request included in the message, to in effect be invisible to the queue 150 (e.g., to be unreadable by the queue) throughout the predefined visibility timeout period. Upon expiration of the predefined visibility timeout period, the queue 150 may then be able to read the message and resend the allocation request to the allocation logic 152 for re-processing. In some examples, the predefined visibility timeout period may be 5 minutes, 10 minutes, or 15 minutes, among other time periods.

In other examples, and as illustrated in FIG. 4, decision 316 may be an optional decision step, and the process 300 may instead directly flow from a no at decision 304 to step 320 (e.g., regardless of how many messages have been generated in association with the allocation request based on DPU deficiency). Similarly, the process 300 may instead directly flow from a no at decision 310 when there is not at least one healthy subnet in the first region 130 to step 320 (e.g., regardless of how many messages have been generated in association with the allocation request based on IP address unavailability). The process 300 described above for allocation request processing is provided merely as an example, and may include additional, fewer, different, or differently arranged steps than depicted in FIG. 3.

The decisions made by the allocation logic 152 as part of the allocation request processing described in FIG. 3 may also cause or trigger generation of alerts. For example, when certain types of available resources of the account 127 have reached a predefined threshold, the allocation logic 152 may send an indication to the monitoring system 120. For example, when determining the DPUs currently available to the account 127 at decision 304, an indication of high DPU use may be sent to the monitoring system 120 in response to further determining a predetermined threshold percentage of the DPU limit has been used (e.g., 80% of DPU limit in use). As another example, when determining the currently available IP addresses of the subnets at decision 306 and/or decision 310, an indication of high IP address use may be sent to the monitoring system 120 in response to further determining that a number of IP addresses that are currently in use (and thus unavailable) across the account 127 is greater than a predetermined threshold percentage (e.g., 80% of IP addresses in use). Based on these types of indications, the monitoring system 120 may generate an alert to send to the user (e.g., via the application 104 or other communication means). The alert may, for example, allow the user to proactively request adjustments to the account, such as additional DPUs if needed, and may provide proof of the need to do so. Additionally, if any processes of the allocation logic 152 fail and/or the data store 160 storing the resource status table 162 is down (e.g., the attempts for the allocation logic 152 to write to or notate the resource status table 162 fail as discussed in more detail below), the allocation logic 152 may send a corresponding indication to the monitoring system 120. Based on the indication, the monitoring system 120 may generate an alert to send to the user to prompt a correction.

Additionally, in some examples, the components, decisions, and/or steps described with reference to FIG. 3, associated with allocation request processing may be integrated or otherwise defined as a feature of the orchestration system 116 that may be turned on and off. For example, this feature may be most advantageous when an increased number of jobs are to be run or workloads associated with the jobs to be run are unpredictable and/or known to be high workloads. In some examples, the turn on and turn off of the feature may be enabled though a user interface toggle provided via an application associated with the orchestration system 116 and/or the application 104 associated with the data processing system 112. In other examples, the turn on and turn off feature may be automated based on one or more rules. An example rule that may trigger a turn on of the feature may be based on the number of DPUs being utilized in the account 127. For example, an API call may be configured to request the number of DPUs being utilized and if the number of DPUs being utilized (e.g., a percentage of DPU limit being utilized) meets or exceeds a threshold value, the feature may be automatically turned on.

Returning back to FIG. 2, after sequentially processing the plurality of allocation requests from the queue 150, using the process 300 described with reference to FIG. 3, to determine the respective subnet of the respective region to allocate each job of at least a subset of the plurality of jobs to (e.g., at least the jobs for which sufficient DPUs and IP addresses of healthy subnets were determined to be available to perform), the process 200 may proceed to step 206. At step 206, the process 200 may include maintaining the resource status table 162 for the account 127 based on the allocation determinations. For example, the maintaining of the resource status table 162 may include storing an indication of (e.g., by notating) the allocation of each job to the respective subnet of the respective region. As previously mentioned, the resource status table 162 may be a ledger, and notating the allocation may include generating a first entry for each job that is allocated in the ledger. In addition to the respective subnet of the respective region to which the job is allocated to, the entry may include a number of DPUs of the account 127 allocated to the job, and a number of Internet IP addresses of the respective subnet allocated to the job. In some examples, the allocation logic 152 may be unable to notate the allocation (e.g., may be unable to write to the ledger). For example, the one or more data storage systems 118 hosting the data store 160 configured to store the resource status table 162 may be down (e.g., service may be unavailable). The allocation logic 152 may retry to notate the allocation a predetermined number of times. However, once the predetermined number of retries are reached, the allocation request for the job may be returned to the queue 150. For example, a message including the allocation request that is associated with the above-discussed visibility timeout may be generated and transmitted to the queue 150 to enable subsequent re-processing of the allocation request upon expiration of the visibility timeout.

At step 208, the process 200 may include allocating each job of at least the subset of the plurality of jobs to the respective subnet of the respective region determined based on the processing to cause an execution of an instance of each job associated with the respective subnet of the respective region.

At step 210, the process 200 may include, subsequent to a completion of each job that is allocated, updating the resource status table 162 based on a deallocation request for each job received at the queue 150. The deallocation request may be received, at the queue 150, from the job. For example, a call back feature enabled by the orchestration system 116 may allow the completed job to call back the orchestration system 116 to place the deallocation request back into the queue 150. The deallocation request may include the name, the number of workers, and the worker type of the workers for the job (e.g., similar to the allocation request for the job), along with an identifier of the respective subnet of the respective region to which the job was allocated. Additionally, when the queue 150 includes multiple queues, the deallocation request may also include the priority associated with the job. In such examples, the deallocation request may be specifically received at one of the queues corresponding to the priority of the job included in the deallocation request. The deallocation request may be placed in the queue 150 amongst other allocation and deallocation requests received for other jobs. The deallocation request may be processed by the allocation logic 152 in the order in which the deallocation request was received by the queue 150. However, the deallocation requests may be processed before the allocation requests such that allocation decisions can be more accurately made based on a most up to date resource availability of the account 127, as indicated by the deallocation requests.

As part of the processing of the deallocation request, the allocation logic 152 may notate the deallocation in the resource status table 162. For example, when the resource status table 162 is a ledger, the allocation logic 152 may generate a second entry in the ledger associated with the deallocation of the job. The second entry may include the number of DPUs of the account 127 deallocated from the job, and the number of Internet IP addresses of the respective subnet deallocated from the job. These values may be determined from the information included in the deallocation request. For example, the number of DPUs of the account 127 deallocated from the job may be derived based on the number of workers and the worker type of the workers for the job included in the deallocation request. The number of Internet IP addresses of the respective subnet deallocated from the job may be derived from (e.g., correspond to) the number of workers included in the deallocation request.

Resultantly, via the steps 206 and 210, the resource status table 162 may be a continuously updated to track resources within the account 127, such as DPUs and IP addresses of subnets across regions of the account 127, in near real time as they are allocated (become unavailable) and then deallocated (become available again) for use by the allocation logic 152 in making allocation decisions, as described above with reference to FIG. 3.

The process 200 described above for orchestrating jobs is provided merely as an example, and may include additional, fewer, different, or differently arranged steps than depicted in FIG. 2.

FIG. 4 depicts a system flow diagram 400 of an example job orchestration process, including the process 200 and the process 300 described above with reference to FIG. 2 and FIG. 3, respectively. For example, when job A 402 associated with the data processing system 112 is generated, a plurality of instances of the job A 402 may be generated. The instances may be identical to one another. A number of instances generated may correspond to a number of the subnets across the plurality of regions of the account 127. Each one of the instances of the job A 402 may then be associated with one of the subnets. For example, a first instance 404 of the job A 402 may be associated with the subnet A 134 of the first region 130. A second instance 406 of the job A 402 may be associated with the subnet B 138 of the first region 130. A third instance 408 of the job A 402 may be associated with the subnet C 144 of the second region 140. A fourth instance 410 of the job A 402 may be associated with the subnet D 148 of the second region 140. Similar operations may be performed for each job generated by the data processing system 112 (e.g., instances may be generated for every job through job N).

The job A 402 may be sent from the data processing system 112 to the scheduling system 114. The scheduling system 114 may generate and send an allocation request 412 for the job A 402 to the orchestration system 116 for placement in the queue 150. In other examples, the data processing system 112 may generate the allocation request 412 for the job A 402, and the scheduling system 114 may simply intercept and pass through the allocation request 412 to the orchestration system 116 at an appropriate timing.

The queue 150 may include a plurality of queues corresponding to a plurality of priority levels, such as a main queue 414 and a priority queue 416. While only one priority queue (e.g., priority queue 416) is shown in FIG. 4, in other examples, the queue 150 may include a plurality of priority queues in addition to the main queue 414. As previously discussed, the orchestration system 116 may receive a priority indicator 411 for the job A 402 automatically determined by the priority system 115 based on one or more of a plurality of rules. For example, for the job A 402, scheduling system 114 may generate and send a priority request, including job attributes of the job A 402, to the priority system 115. The priority system 115 may apply the rules to the job attribute to determine the priority for the job A 402. The priority system 115 may then provide the priority indicator 411, indicating the determined priority, to the scheduling system 114 as a response to the priority request for inclusion within the allocation request 412 or independent forwarding to the orchestration system 116. Based on the priority indicator 411, the allocation request 412 may be placed in a corresponding queue (e.g., one of the main queue 414 or the priority queue 416). Both the main queue 414 and the priority queue 416 may be FIFO queues. For example, any requests placed in the main queue 414 are sent to the allocation logic 152 for processing in the order they are received at the main queue 414. Similarly, any requests placed in the priority queue 416 are sent to the allocation logic 152 for processing in the order they are received at the priority queue 416. However, the priority queue 416 may be prioritized over the main queue 414. Resultantly, any requests placed in the priority queue 416 may be sent to the allocation logic 152 for processing prior to any requests in the main queue 414, even if a request in the main queue 414 was received prior to the request in the priority queue 416.

Upon receiving the allocation request 412, the allocation logic 152 may perform a series of one or more decisions, such as the decisions 304, 306, and/or 310 described in detail above with reference to FIG. 3. For example, at decision 304, a determination of whether a number of DPUs currently available to the account 127 meets or exceeds a number of DPUs for performing the job A 402 may be made. If at decision 304, the number of DPUs currently available to the account 127 is determined to meet or exceed the number of DPUs for performing the job A 402 (yes), the process 300 may proceed to decision 306.

At decision 306, a determination of whether two or more subnets of the first region 130, such as the subnet A 134 and the subnet B 138, meet one or more subnet conditions to perform the job A 40 may be made. If each of the one or more subnet conditions are determined to be met for the subnet A 134 and the subnet B 138 of the first region 130 at decision 306 (yes), the job A 402 may be allocated to one of the subnet A 134 and the subnet B 138 based on one or more load balancing techniques.

For example, the job A 402 may be determined to be allocated to the subnet A 134. The allocation logic 152 may notate the allocation in the resource status table 162. For example, when the resource status table 162 is a ledger, the allocation logic 152 may generate a first entry in the ledger associated with the allocation of the job A 402. The first entry may include a number of DPUs of the account 127 allocated to the job A 402, and a number of Internet IP addresses of the subnet A 134 allocated the job A 402.

Upon allocation, the first instance 404 of the job A 402 associated with the subnet A 134 may be executed by the subnet A 134. Once the subnet A 134 completes the job A 402 (e.g., executes the one or more operations or tasks thereof) a deallocation request 420 may be generated and sent to the queue 150. For example, a call back feature enabled by the orchestration system 116 may allow the job A 402 to call back the orchestration system 116 to place the deallocation request 420 back into the queue 150. The deallocation request 420 may include the name, the number of workers, and the worker type of the workers for the job A 402 (e.g., similar to the allocation request 412), along with an identifier of the subnet A 134 of the first region as being the respective subnet to which the job A 402 was allocated. Additionally, in some examples, the deallocation request 420 may also include the priority indicator 411 for the job A 402. In such examples, the deallocation request 420 may specifically be placed in one of the main queue 414 or the priority queue 416 corresponding to the priority of the job A 402, as indicated by the priority indicator 411. The deallocation request 420 may be placed in the queue 150 amongst other allocation and deallocation requests received for other jobs. The deallocation request 420 may be processed by the allocation logic 152 in the order in which it received by the queue 150. However, deallocation requests, including the deallocation request 420, may be prioritized over any allocation requests.

As part of the processing of the deallocation request 420, the allocation logic 152 may notate the deallocation in the resource status table 162. For example, when the resource status table 162 is a ledger, the allocation logic 152 may generate a second entry in the ledger associated with the deallocation of the job A 402. The second entry may include the number of DPUs of the account 127 deallocated from the job A 402, and the number of Internet IP addresses of the subnet A 134 deallocated from the job A 402. These values may be determined from the information included in the deallocation request 420 (e.g., similar to how the values are determined from similar information included in the allocation request 412 as described in detail with reference to FIGS. 2 and 3).

Returning back to decision 306, if at decision 306, there is a failure to identify at least two subnets of the first region 130 that meet each of the subnet conditions (no), the process 300 may proceed to decision 310. At decision 310, a determination of whether at least one subnet of the first region 130, such as one of the subnet A 134 or the subnet B 138, meets the subnet conditions to perform the job A 402 may be made. If at decision 310, at least one subnet of the first region 130, such as the subnet A 134, is determined to meet the subnet conditions to perform the job A 402 (yes), the job A 402 may be allocated to subnet A 134. Similar post-allocation processes to those described above with respect to the allocation of the job A 402 to subnet A 134 following decision 306 may be performed. Alternatively, if at decision 310, no subnet of the first region 130 is determined to meet the subnet conditions to perform the job A 402 because there are no healthy subnets in the first region 130 (*no*), the job A 402 may be failed over or allocated to one of the subnets of the second region 140, such as the subnet C 144 or the subnet D 148. Once the job A 402 is allocated one of the subnets of the second region 140, similar post-allocation processes to those described above with respect to the allocation of the job A 402 to subnet A 134 following decision 306 may be performed by the respective subnet. Or, if at decision 310, no subnet of the first region 130 is determined to meet the subnet conditions to perform the job A 402 because there is at least one healthy subnet but that subnet does not have sufficient IP addresses available for performing the job A 402 (*no*), a message 418 may be generated in association with the allocation request 412 that is transmitted to the queue 150, as described in detail below.

Returning to decision 304, if at decision 304, the number of DPUs currently available to the account 127 is determined not to meet or exceed the number of DPUs for performing the job A 402 (*no*), the message 418 may be generated in association with the allocation request 412 that is transmitted to the queue 150. At the queue 150, the message 418 may be placed in one of the main queue 414 or the priority queue 416 corresponding to the priority of the job A 402, as indicated by the priority indicator 411, for re-processing. The message 418 may include the allocation request 412 and be associated with a predefined visibility timeout period. For example, the timer 154 may be configured to place a visibility timeout on the message 418 that corresponds to a predefined visibility timeout period. The placement of the visibility timeout on the message 418 may cause the message 418 and thus the allocation request 412 to in effect be invisible to the queue 150 (e.g., to be unreadable by the queue 150) throughout the predefined visibility timeout period. Upon expiration of the predefined visibility timeout period, the queue 150 may then be able to read the message 418 and resend the allocation request 412 to the allocation logic 152 for re-processing (e.g., to cause the allocation logic 152 to again perform a series of decisions 304, 306, and/or 310).

In general, any process or operation discussed in this disclosure that is understood to be computer-implementable, such as the processes or operations depicted in FIGS. 2-4, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 5:
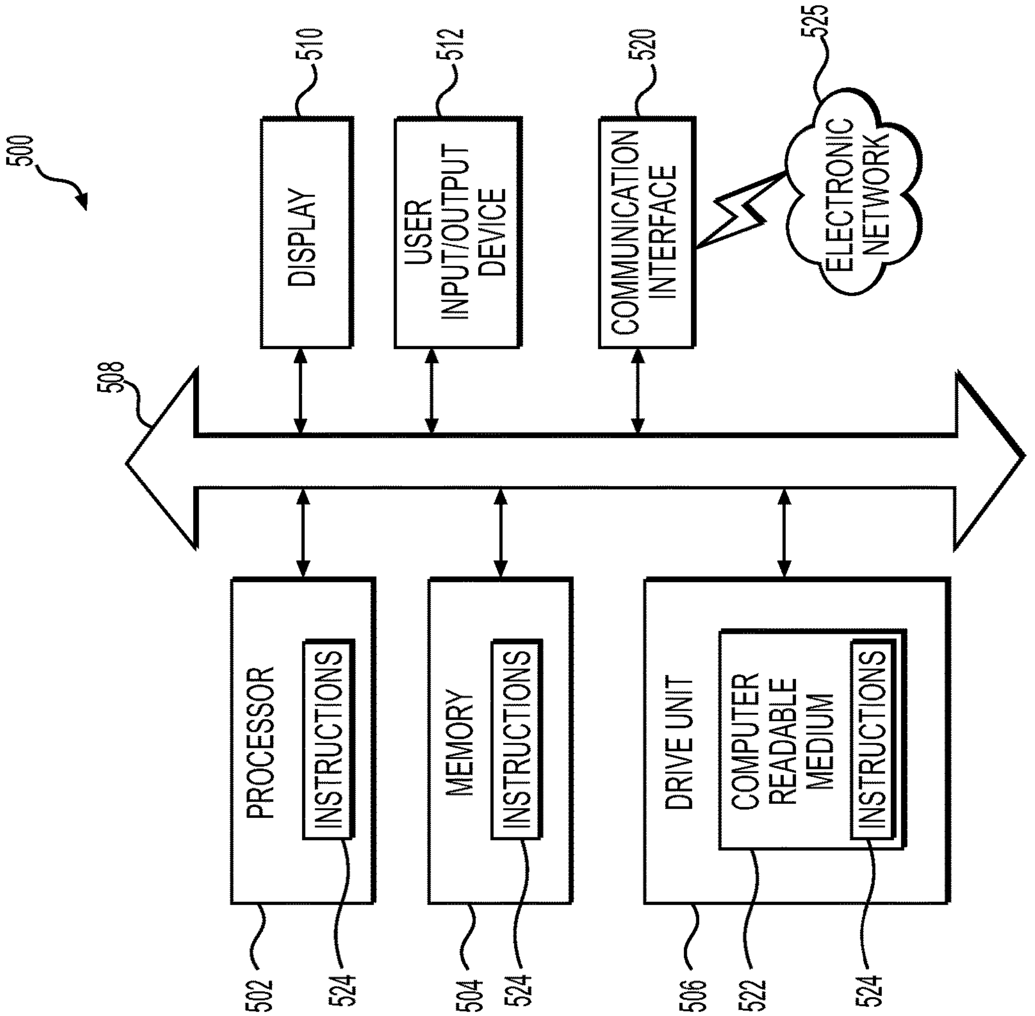
FIG. 5 depicts an example of a computer, according to certain aspects.

FIG. 5 depicts an example of a computer 500, according to certain embodiments. FIG. 5 is a simplified functional block diagram of a computer 500 that may be configured as a device for executing processes or operations depicted in, or described with respect to, FIGS. 2-4, according to exemplary embodiments of the present disclosure. For example, the computer 500 may be configured as the computing device 102, one of the server-side systems 108, and/or another device according to exemplary embodiments of this disclosure. In various embodiments, any of the systems herein may be a computer 500 including, e.g., a data communication interface 520 for packet data communication. The computer 500 may communicate with one or more other computers 500 using the electronic network 525. The electronic network 525 may include a wired or wireless network similar to the network 106 depicted in FIG. 1.

The computer 500 also may include a central processing unit ("CPU"), in the form of one or more processors 502, for executing program instructions 524. The program instructions 524 may include instructions for running one or more applications, including the application 104 (e.g., if the computer 500 is the computing device 102). The program instructions 524 may include instructions for running one or more operations of the server-side systems 108 (e.g., if the computer 500 is a server device or other similar computing device of one or more of the respective server-side systems 108). The computer 500 may include an internal communication bus 508, and a drive unit 506 (such as read-only memory (ROM), hard disk drive (HDD), solid-state disk drive (SDD), etc.) that may store data on a computer readable medium 522, although the computer 500 may receive programming and data via network communications. The computer 500 may also have a memory 504 (such as random access memory (RAM)) storing instructions 524 for executing techniques presented herein, although the instructions 524 may be stored temporarily or permanently within other modules of computer 500 (e.g., processor 502 and/or computer readable medium 522). The computer 500 also may include user input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for orchestrating jobs, the method comprising:

receiving, from a queue, a first allocation request for a first job of a plurality of jobs, wherein a plurality of instances of the first job have been generated and associated with a plurality of subnets of a plurality of regions of an account;

determining a number of data processing units currently available to the account meets or exceeds a number of data processing units for performing the first job;

determining at least a first subnet of a first region and a second subnet of the first region, of the plurality of subnets of the plurality of regions, meet one or more subnet conditions to perform the first job;

based on one or more load balancing rules, determining to allocate the first job to one of the first subnet or the second subnet to cause execution of an instance of the first job, from the plurality of instances of the first job, associated with the one of the first subnet or the second subnet;

storing, in a data store associated with the account, an indication of the allocating of the first job to the one of the first subnet or the second subnet;

subsequent to a completion of the first job, receiving, from the queue, a first deallocation request for the first job; and updating the data store based on the first deallocation request.

2. The method of claim 1, wherein determining the number of data processing units currently available to the account meets or exceeds the number of data processing units for performing the first job comprises:

identifying a number of workers to perform the first job and a worker type of the workers included in the first allocation request;

determining the number of data processing units for performing the first job based on the number of workers and the worker type of the workers;

querying the data store to determine the number of data processing units currently available to the account; and comparing the number of data processing units currently available to the account with the number of data processing units for performing the first job.

3. The method of claim 1, wherein the one or more subnet conditions to perform the first job include a positive health status and a number of currently available Internet Protocol (IP) addresses that meets or exceeds a number of IP addresses for performing the first job.

4. The method of claim 3, wherein determining at least the first subnet of the first region and the second subnet of the first region meet the one or more subnet conditions to perform the first job comprises:

determining the number of IP addresses for performing the first job based on a number of workers to perform the first job included in the first allocation request;

receiving, as a response to an application programming interface (API) call transmitted to each of the first subnet and the second subnet, a positive health status and a number of currently available IP addresses of each of the first subnet and the second subnet; and comparing the number of currently available IP addresses of the first subnet and the second subnet with the number of IP addresses for performing the first job.

5. The method of claim 1, wherein the data store includes a resource status table, and storing the indication of the allocating of the first job to the one of the first subnet or the second subnet comprises:

generating a first entry for the first job in the resource status table, the first entry including a number of data processing units of the account allocated to the first job, and a number of Internet Protocol (IP) addresses of the one of the first subnet or the second subnet allocated to the first job.

6. The method of claim 5, wherein updating the data store based on the first deallocation request comprises:

generating a second entry for the first job in the resource status table, the second entry including the number of data processing units deallocated from the first job, and the number of IP addresses of the one of the first subnet or the second subnet deallocated from the first job.

7. The method of claim 1, further comprising:

placing the first allocation request for the first job in the queue, among one or more other allocation requests for one or more other jobs of the plurality of jobs, based on a receiving order to the queue.

8. The method of claim 7, wherein the queue is a first queue of a plurality of queues corresponding to a priority associated with the first job.

9. The method of claim 1, further comprising:

receiving, from the queue, a second allocation request for a second job of the plurality of jobs;

determining a number of data processing units currently available to the account is less than a number of data processing units for performing the second job; and generating and transmitting, to the queue, a message associated with a predefined visibility timeout period that includes the second allocation request for the second job, wherein upon expiration of the predefined visibility timeout period, the message becomes visible to the queue, and the second allocation request for the second job is received again from the queue to determine whether a number of data processing units currently available to the account meets or exceeds the number of data processing units for performing the second job.

10. The method of claim 9, further comprising:

determining a number of messages generated for the second allocation request for the second job is less than a predefined threshold number of messages; and generating and transmitting the message in response to the determining.

11. The method of claim 1, further comprising:

receiving, from the queue, a second allocation request for a second job of the plurality of jobs;

determining a number of data processing units currently available to the account meets or exceeds a number of data processing units for performing the second job;

determining only the first subnet of the first region meets one or more subnet conditions to perform the second job; and allocating the second job to the first subnet.

12. The method of claim 1, further comprising:

receiving, from the queue, a second allocation request for a second job of the plurality of jobs;

determining a number of data processing units currently available to the account meets or exceeds a number of data processing units for performing the second job;

determining no subnets of the first region meet one or more subnet conditions to perform the second job, wherein the one or more subnet conditions to perform the second job include a positive health status and a number of currently available Internet Protocol (IP) addresses that meets or exceeds a number of IP addresses for performing the second job; and when each of the subnets of the first region have a negative health status, allocating the second job to a third subnet of a second region, of the plurality of subnets of the plurality of regions; or when at least one of the subnets of the first region has a positive health status, generating and transmitting, to the queue, a message associated with a predefined visibility timeout period that includes the second allocation request for the second job.

13. A method for orchestrating jobs, the method comprising:

receiving, at a queue, a plurality of allocation requests for a plurality of jobs, wherein a plurality of instances of each job of the plurality of jobs have been generated and associated with a plurality of subnets of a plurality of regions of an account;

sequentially processing the plurality of allocation requests from the queue to determine a respective subnet of a respective region, of the plurality of subnets of the plurality of regions, to allocate each job of at least a subset of the plurality of jobs to, wherein the determination is based on a number of data processing units currently available to the account and one or more subnet conditions of the plurality of subnets;

maintaining a resource status for the account based on the determined allocations;

allocating each job of at least the subset of the plurality of jobs to the respective subnet of the respective region determined based on the processing to cause an execution of an instance of each job associated with the respective subnet of the respective region;

subsequent to a completion of each job of at least the subset of the plurality of jobs, receiving, at the queue, a deallocation request for each job; and updating the resource status based on the deallocation request.

14. The method of claim 13, wherein, for each job of the plurality of jobs, processing a corresponding allocation request from the plurality of allocation requests comprises:

identifying a number of workers to perform the job and a worker type of the workers included in the corresponding allocation request;

determining the number of data processing units for performing the job based on the number of workers and the worker type of the workers;

querying a table associated with the resource status to determine the number of data processing units currently available to the account;

comparing the number of data processing units currently available to the account with the number of data processing units for performing the job; and based on the comparing, determining whether a number of data processing units currently available to the account meets or exceeds a number of data processing units for performing the job.

15. The method of claim 14, wherein, when the number of data processing units currently available to the account is less than the number of data processing units for performing the job, generating and transmitting, to the queue, a message associated with a predefined visibility timeout period that includes the corresponding allocation request for the job, wherein the message causes a re-processing of the corresponding allocation request upon expiration of the predefined visibility timeout period.

16. The method of claim 14, wherein, when the number of data processing units currently available to the account meets or exceeds the number of data processing units for performing the job, and at least a first subnet of a first region and a second subnet of the first region are determined to meet the one or more subnet conditions, determining the respective subnet of the respective region to allocate the job to comprises:

applying one or more load balancing rules to determine one of the first subnet or the second subnet as the respective subnet of the respective region to allocate the job to.

17. The method of claim 14, wherein, when the number of data processing units currently available to the account meets or exceeds the number of data processing units for performing the job, and only a first subnet of a first region is determined to meet the one or more subnet conditions, the first subnet of the first region is determined as the respective subnet of the respective region to allocate the job to.

18. The method of claim 14, wherein, when the number of data processing units currently available to the account meets or exceeds the number of data processing units for performing the job, and no subnets of a first region are determined to meet the one or more subnet conditions, one of:

generating and transmitting, to the queue, a message associated with a predefined visibility timeout period that includes the corresponding allocation request for the job, wherein the message causes a re-processing of the corresponding allocation request upon expiration of the predefined visibility timeout period; or determining a third subnet of a second region as the respective subnet of the respective region to allocate the job to.

19. The method of claim 18, wherein the queue is a first queue of a plurality of queues corresponding to a first priority, and the plurality of allocation requests received at the first queue are each associated with the first priority.

20. A method for orchestrating jobs, the method comprising:

receiving an allocation request for a job;

selecting a subnet of a region, of a plurality of subnets of a plurality of regions of an account, to perform the job based on a determination that (i) a number of data processing units currently available to the account meets or exceeds a number of data processing units for performing the job derived from the allocation request, and (ii) the subnet meets one or more subnet conditions for performing the job, the one or more subnet conditions including a number of currently available Internet Protocol (IP) addresses of the subnet that meets or exceeds a number of IP addresses for performing the job derived from the allocation request;

tracking resources to be allocated to the selected subnet of the region for performing the job, the resources including the number of data processing units of the account and the number of IP addresses of the subnet of the region allocated for performing the job;

allocating the job to the selected subnet of the region to be performed; and subsequent to a completion of the job, receiving a deallocation request for the job, wherein the tracked resources are indicated as available resources for a subsequent allocation based on the deallocation request.

* * * * *